Figure 5:
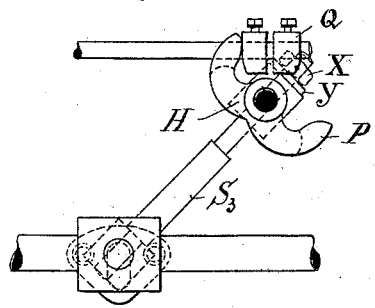

(No Model.) 2 Sheets—Sheet 1.
W. VOIT.
VALVE GEAR FOR ENGINES.
No. 319,433. Patented June 2, 1885.
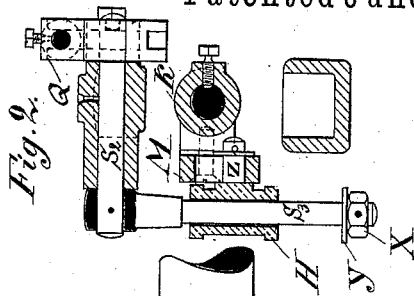
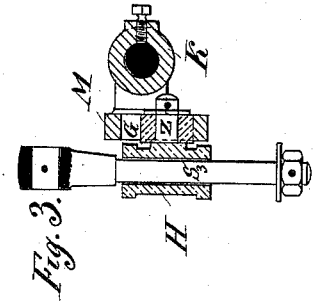
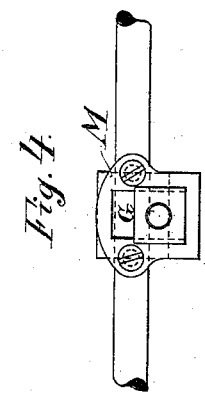
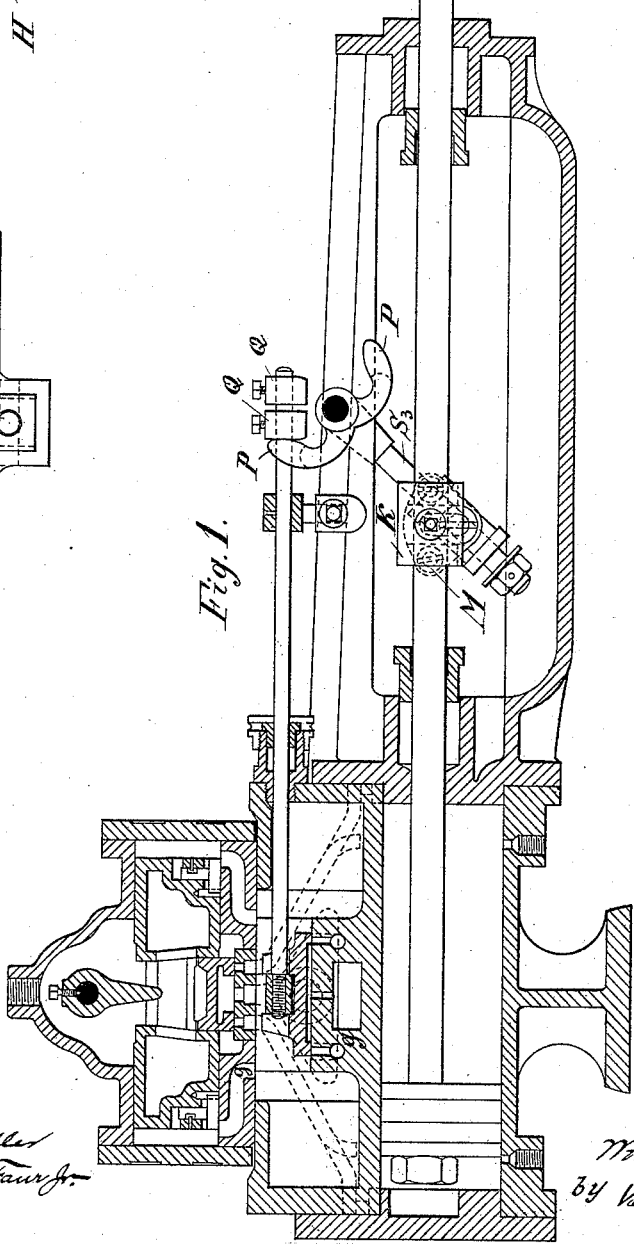
Witnesses
William Miller
A Faber du Faur Jr.
Inventor
William Voit
by Van Santvoord & Hauff,
his att'ys (No Model.) 2 Sheets—Sheet 2.

W. VOIT.
VALVE GEAR FOR ENGINES.

No. 319,433. Patented June 2, 1885.

Witnesses
William Miller
A Faber du Faur Jr

Inventor
William Voit
by Van Santvoord & Hauff
his atty's

UNITED STATES PATENT OFFICE.

WILLIAM VOIT, OF MAGDEBURG, PRUSSIA, GERMANY.

VALVE-GEAR FOR ENGINES.

SPECIFICATION forming part of Letters Patent No. 319,433, dated June 2, 1885.

Application filed February 12, 1885. (No model.)

*To all whom it may concern:*

Be it known that I, WILLIAM VOIT, a subject of the King of Bavaria, residing at Magdeburg, Prussia, have invented new and useful Improvements in Valve-Gears for Engines, of which the following is a specification.

This invention has for its object to provide novel means for actuating the auxiliary slide-valve of a steam-engine by the movement of the piston-rod; and it consists in the combination of devices hereinafter described and claimed, reference being made to the accompanying drawings, in which—

Figure 1 is a longitudinal section through the engine (steam-pump with side view of the gear.) Fig. 2 is a section of the gear. Figs. 3 to 9 show in side view and section several modifications of the gear.

Similar letters indicate corresponding parts.

The reciprocating motion of the piston-rod is to be transmitted to the rod of the auxiliary slide-valve in such a manner that the latter moves in a direction opposite that of the piston-rod. As the stroke of the small slide-valve, compared with that of the piston, is proportionally a very short one, and the reversing must take place only when the piston is approaching the end of its stroke, the following arrangement has been made: A coupling, K, is secured to the piston-rod. This coupling gives the bar $S^3$, fixed to the axis $S^2$, an oscillatory motion by means of a socket, H, which is movable in a piece, M, secured by two countersunk screws to the coupling, and takes the bar $S^3$ along with it. The latter thereby slides to and fro in the socket. In consequence of the oscillatory motion of the bar $S^3$ the axis $S^2$ is also put in an oscillatory motion, which is transmitted to the tappets P, and these latter move to and fro for actuating the regulating-rings Q, and consequently move the auxiliary slide-valve. The steam-piston, Fig. 1, moves in the direction of the arrow, and the auxiliary slide-valve in the position shown in the drawings is just beginning to open the canal, whereupon the distributing-piston is moved to the other side and the steam allowed to enter behind the steam-piston. The canal $g$ must suddenly be opened, and the motion of the regulating-rings Q therefore be an accelerated one. The circular shape and disposition of the tappets P P by fixing them directly to the axis $S^2$ is very important for obtaining this accelerated motion, as they move on the regulating-pieces Q from below to the top. To the lower end of the bar $S^3$ is fixed a screw-nut, X, provided with a washer, Y. When the piston now moves a little more to the left than shown in the drawings, Fig. 1, the socket H will strike against the washer Y. The socket H and the bar $S^3$ are stopped in their reciprocal motion and obliged to raise together in the slit W, into which catches the peg Z, fixed to the socket. The angular motion of the axis $S^2$ and the rotation of the tappet P, respectively, the displacement of the auxiliary slide-valve will hereby increase and be accelerated. The gearing can be adjusted in two different manners, first, by displacing the pieces Q on the auxiliary valve-rod; and, secondly, by displacing the nut X, respectively by employing a thicker or thinner washer, Y. The greater the distance is between the two pieces Q from each other the sooner the canal $g$ will be opened. The nearer the nut X is adjusted toward the socket H, on the bar $S^3$, the sooner the socket will strike against the washer Y, and the sooner the quick motion of the auxiliary slide-valve will take place. The two pieces Q, fixed by pinching-screws, may be replaced by one piece of the double width when the gearing has definitely been adjusted.

Figs. 3 and 4 of the annexed drawings show the construction of the coupling K for large engines. The peg of the socket H is here lodged in a block, G, sliding in the slit.

Figure 6:
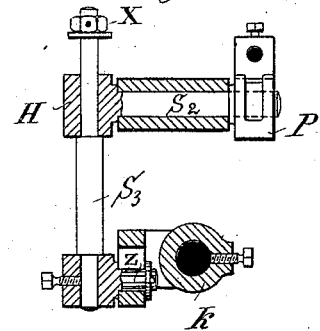

Figs. 5 and 6 show a modification of the construction shown in Figs. 1 and 2. The socket H is cast in one piece with the attached axis $S^2$, and the tappet P attached to the axis $S^2$ in the same manner as formerly. In this arrangement the socket H turns only and does not get out of its place; but the bar $S^3$ raises now in the slit of the coupling K as soon as the nut X with the washer Y will strike against the socket H. (See Fig. 1.)

Figure 7:
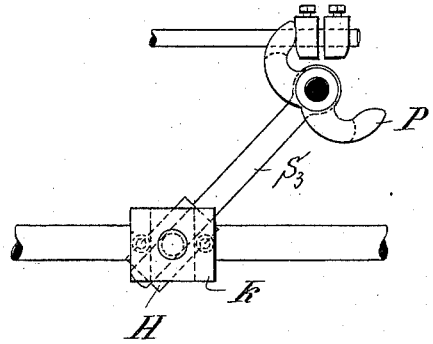
Figure 8:
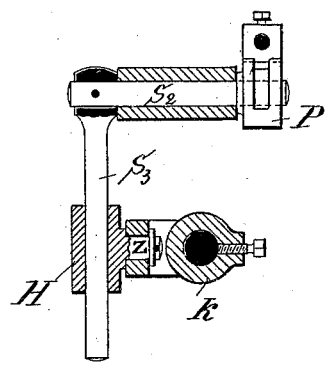
Figure 9:
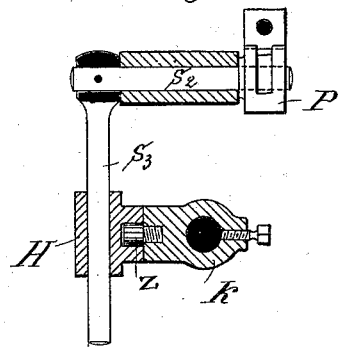

In many cases where it is desirable to suppress the slit the arrangement shown in Figs. 7, 8, and 9 may advantageously be applied. In Fig. 8 the peg Z is cast in one piece with the socket turning about the peg Z, and in Fig. 9 the peg Z is screwed in the coupling K. The socket is here correspondingly bored out.

What I claim as new, and desire to secure by Letters Patent, is—

1. The combination, with the piston and valve-rods, of a socket secured to the piston-rod, a regulating ring or rings on the valve-rod, a rocking axle having directly attached to one end two tappets between which the regulating ring or rings are arranged, and a swinging bar connected with the rocking axle and loosely connected with the socket on the piston-rod, substantially as described.

2. The combination, with the piston and valve rods, of the socket K on the piston-rod, the rocking axle $S^2$, provided at one end with two attached tappets between which the regulating-rings Q on the valve-rod are connected, the swinging-bar $S^3$ connected with the other end of the rocking axle, and a pivotal connection, Z, between the lower end of the swinging bar and the socket on the piston-rod for swinging the tappets in the arc of a circle and causing them to act upon the regulating-rings from the bottom toward the top thereof, substantially as described.

3. The combination, with the piston and valve rods, of the socket K on the piston-rod provided with a slot, the socket H, having the attached pin Z movable in the slot, the rocking axle $S^2$, provided with two attached tappets, P, between which the regulating-rings Q on the valve-rod are arranged, and the swinging bar $S^3$, secured to the other end of the rocking axle and passing through the socket H for imparting to the valve an accelerated motion when the piston-rod approaches the end of its stroke, substantially as described.

4. The combination, with the piston rod and valve-rod, of the socket K on the piston-rod, the rocking axle $S^2$, provided at one end with the tappets P, the rocking bar $S^3$, connected with the other end of the axle and loosely connected with the socket on the piston-rod, and the adjustable screw-nut X and washer Y on the swinging bar, substantially as described.

In testimony whereof I have signed my name to this specification in the presence of two subscribing witnesses.

WILLIAM VOIT.

Witnesses:
   JOH. HENKES,
   B. ROI.